Patented May 8, 1928.

1,669,363

UNITED STATES PATENT OFFICE.

HAROLD L. WATSON, OF LYNN, MASSACHUSETTS, ASSIGNOR TO GENERAL ELECTRIC COMPANY, A CORPORATION OF NEW YORK.

CELLULAR SILICA PRODUCT AND METHOD OF FABRICATION.

No Drawing. Application filed August 15, 1927. Serial No. 213,195.

The present invention comprises a new silica product of low specific gravity which is of particular value as a heat insulator for refrigerators, furnaces or other thermal devices.

When crystalline quartz is heated to a temperature of about 1700° C. and then is allowed to cool it is converted to a distinct allotropic crystalline form known ordinarily as beta cristobalite. Upon cooling below about 230° C. the beta cristobalite becomes changed to alpha cristobalite which has a porous structure and is "frosty" in appearance somewhat like loaf sugar.

When the same heating and cooling steps are carried out with sufficient rapidity another similar allotropic form of silica known as tridymite is formed which also is porous in its final state.

In accordance with my invention cristobalite or tridymite silica is further expanded by a gas to form a coherent body with innumerable microscopic cavities, and a smaller number of larger cavities varying in size up to about $\frac{1}{16}$" in diameter. The product has a bulk specific gravity of about 0.6 or lower and a correspondingly low heat conductivity.

In carrying out my invention silica in the porous alpha cristobalite or tridymite form is impregnated with an organic material, such as a resin or gum. The impregnated material is heated to a temperature sufficiently high to volatilize the impregnant and soften the silica, thereby further expanding the material in much the way the gases generated by yeast expand dough in the making of bread. This second heating is carried out rapidly up to a temperature of about 1750° C.

My invention may be further illustrated by the following specific example. Granular quartz sand is heated to about 1700° C., is held for about one-half hour at this temperature, and then is cooled to room temperature. The resulting loose granular mass is either cristobalite or tridymite depending on the rates of heating and cooling. This material is mixed with the shellac solution known as "liquid orange shellac". The amount of solution absorbed is regulated to introduce into the silica shellac to the amount of about one per cent by weight of the silica. The mixture is molded to desired shape and then is heated slowly to about 400° C., the solvent being first vaporized from the binder and the shellac residue thereupon being decomposed and carbonized.

The molded product next is heated rapidly to a temperature of about 1750° C. to eliminate the binder residue and to soften the silica and seal over its exterior surface. The binder leaves very little or no carbon residue and produces the multiplicity of small cavities or blebs. These blebs are not connected with one another and hence the material is impervious to moisture.

The heat conductivity of the intumescent silica product is so low that when an oxyhydrogen flame is played upon a slab $\frac{3}{4}$" thick practically no sensation of heat can be felt by the hand upon the opposite side.

What I claim as new and desire to secure by Letters Patent of the United States is:—

1. A silica product which is substantially impervious to moisture and is filled with fine cavities of such number that the specific gravity of said product as a whole is less than unity.

2. The method of treating silica which consists in converting the same to porous condition, impregnating the silica in this condition with an organic binder and thereupon heating to a fusion temperature.

3. The method of preparing highly porous silica which consists in heating crystalline silica to about 1700° C., cooling to a temperature below about 230° C., impregnating with a decomposable binder and reheating rapidly to about 1750° C.

4. A heat insulator comprising a mass of silica having a specific gravity of about .6, a low heat conductivity, being substantially moisture impervious and containing many unconnected cavities varying from about $\frac{1}{16}$ inch down to microscopic dimensions.

In witness whereof, I have hereunto set my hand this eleventh day of August, 1927.

HAROLD L. WATSON.